United States Patent Office 2,728,723
Patented Dec. 27, 1955

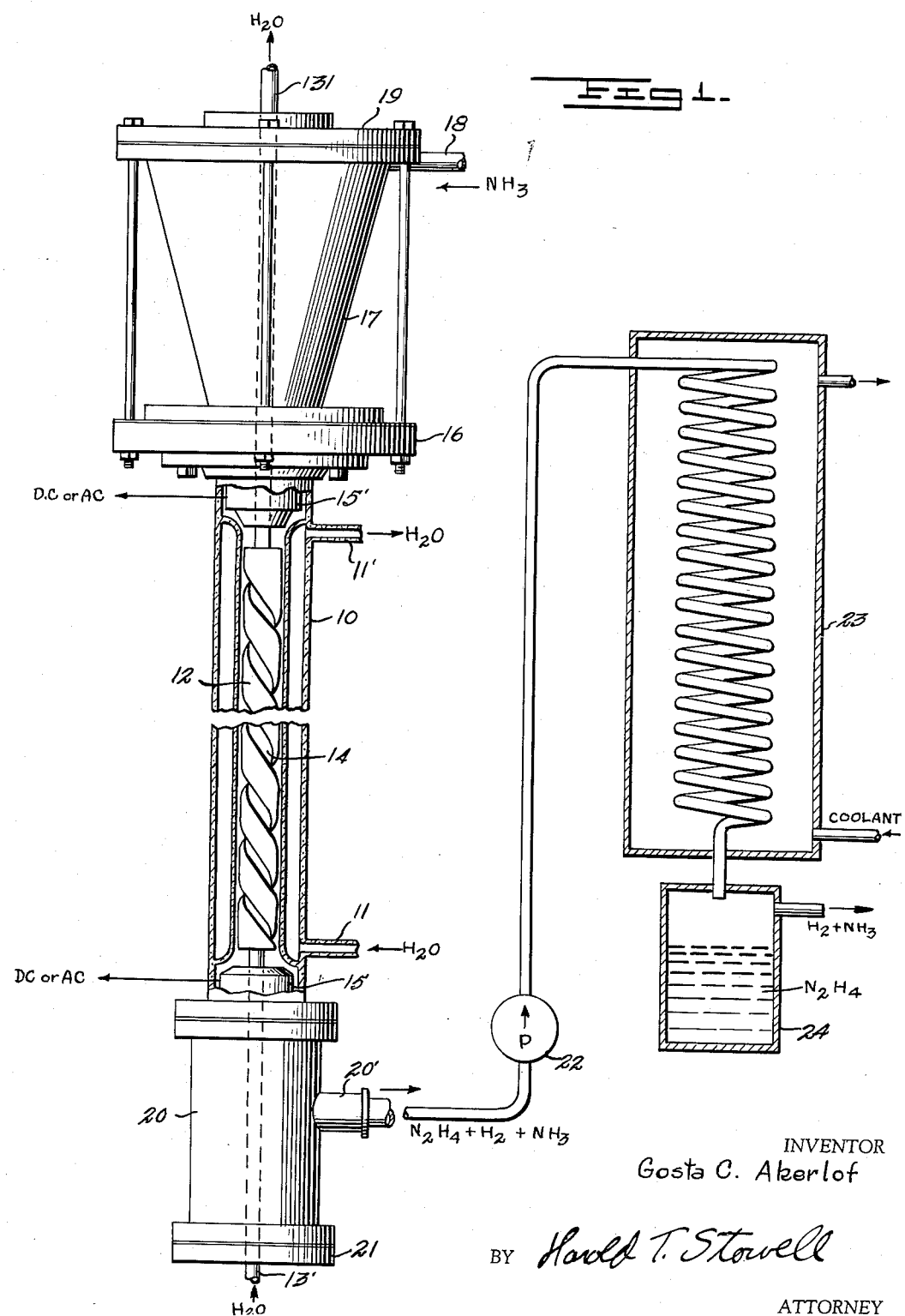

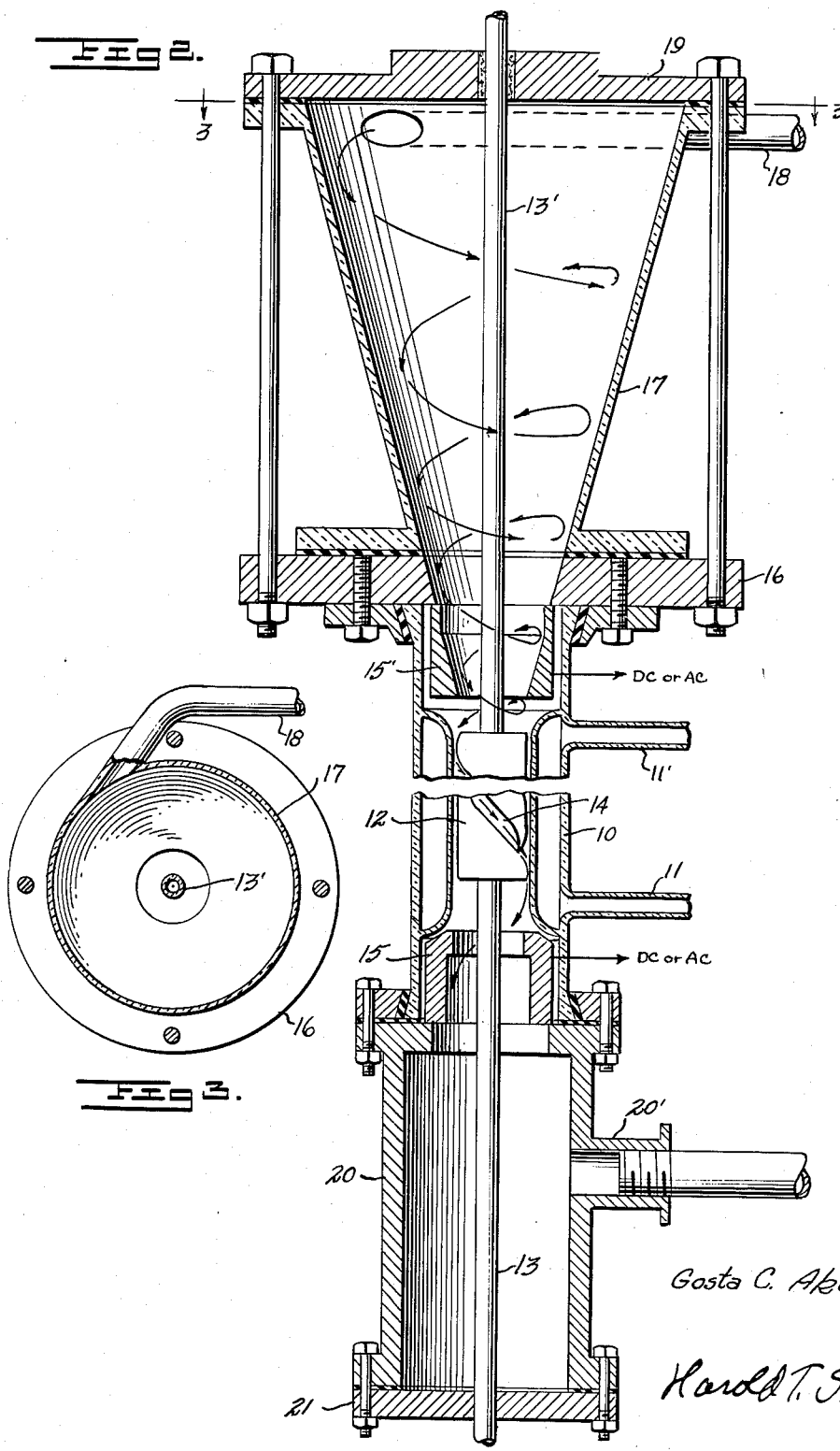

2,728,723

METHOD AND APPARATUS FOR THE PRODUCTION OF HEAT-SENSITIVE SUBSTANCES IN ELECTRICAL GLOW DISCHARGES

Gosta C. Akerlof, Plainsboro, N. J., assignor, by mesne assignments, to the United States of America as represented by the Secretary of the Navy Application January 29, 1953, Serial No. 333,862

3 Claims. (Cl. 204—312)

This invention relates to a method and apparatus for the production of heat-sensitive substances in electrical glow discharges.

The principles of the invention will be particularly described with reference to the production of hydrazine from ammonia in accordance with the equation:

$$2NH_3 = N_2H_4 + H_2$$

It has been found that sustained high yields of hydrazine may be obtained by passing a stream of ammonia through an extended glow discharge if the stream of gas is maintained under conditions of highly turbulent flow in its passage through the discharge and is efficiently cooled while it is in the discharge zone. The desired turbulent flow conditions may be attained by providing a tortuous passage between spaced electrodes maintained at a potential difference effective to form a glow discharge under the prevailing conditions of pressure in the passage. Effective cooling of the gases in the discharge passage may be attained by continuously cooling the walls of the passage.

Highly turbulent flow and effective cooling are both facilitated by providing in an elongated chamber defined by coolable wall members a centrally positioned tubular member, through which a coolant may be passed, having its external surface fluted to form in cooperation with the external walls of the chamber a tortuous passage, at each end of which suitable electrode members are positioned. The turbulence of the gas stream may be increased by supplying the gas tangentially into the larger end of a chamber in the shape of a truncated cone opening at the smaller end thereof into the tortuous passage through an annular outlet. In such a truncated conical inlet chamber the inflowing gas will rotate with increasingly greater angular velocity as it approaches the outlet end of the chamber. The size of the conical inlet chamber should be adapted to the size of the reactor passage, the height of the full conical inlet cavity being approximately twice as large as the diameter of its base.

The invention will be more particularly described with reference to the accompanying drawings, in which:

Fig. 1 is a vertical elevation in partial section of a reactor embodying the principles of the invention, together with diagramatically indicated product recovery apparatus;

Fig. 2 is an enlarged vertical section of the reactor of Fig. 1; and

Fig. 3 is a horizontal section on line 3—3 of Fig. 2.

The reactor comprises a hollow walled cylindrical tube 10, advantageously of glass, provided with inlet and outlet nipples 11, 11' for the passage of coolant through the hollow walls of the tube. Centrally positioned within tube 10 is a spirally fluted tube 12, likewise advantageously of glass, having extended tubulatures 13, 13' for the passage of coolant through the interior of the tube and providing in cooperation with the inner walls of tube 10 a spiral passage 14.

Mounted at each end of tube 10 are cylindrical discharge-forming copper electrodes 15, 15' privided with suitable connections to a source of D. C. or A. C. potential and insulating means, not shown in detail.

Attached to the upper end of tube 10 is a head plate 16 centrally bored to connect with the smaller end of truncated conical inlet chamber 17, of glass or metal, having a tangential inlet 18 and provided with an end plate 19 centrally bored to receive tubulature 13'.

Attached to the lower end of tube 10 is a glass or metal T 20 providing an outlet for the reactor through the side arm 20' and for tubulature 13 through end plate 21.

In operation, as shown more particularly in Fig. 1, ammonia is supplied through tangential inlet 18. Flowing vortically downward through inlet chamber 17 at increasing angular velocity it passes through electrode 15' into the upper end of passage 14. The amount of turbulence the gas stream has acquired at the lower end of the inlet chamber will be substantially increased as it rotates around the fluted tube in the passage 14 to a degree governed by the space velocity of the gas, the size of the passage 14, the depth and pitch of the flutes, etc. This turbulence is an important factor in effecting a high rate of heat transfer to the cooled walls of outer tube 10 and inner tube 12, thereby avoiding local overheating and corresponding reduction in yield.

The gas pressure in the reactor is maintained at from 10 to 60 mm. of Hg by pump 22 and the potential across electrodes 15, 15' is maintained at an amount effective to produce a glow electrical discharge, typically about 200 volts per inch. The mixture of hydrazine and hydrogen, together with unreacted ammonia, is pumped to recovery apparatus such as condenser 23 wherein the hydrazine is condensed out and collected in tank 24.

The details of construction shown and described by way of illustration may clearly be widely varied without departing from the principles of the invention as defined in the appended claims.

I claim:

1. Apparatus for producing hydrazine from gaseous reactants in electrical glow discharges, comprising walls defining an elongated chamber, a hollow tubular member positioned within said chamber and cooperating with said walls to define a tortuous passage through said chamber, electrode members at each end of said tortuous passage, means for maintaining an electrical potential between said electrode members, means for passing a gaseous reactant through said tortuous passage, means for passing a coolant through said tubular member, and means for cooling said walls.

2. Apparatus for producing hydrazine from gaseous reactants in electrical glow discharges comprising walls defining an elongated chamber, a hollow tubular member positioned within said chamber and spirally fluted externally to define with said walls a spiral passage through said chamber, electrode members at each end of said spiral passage, means for maintaining an electrical potential between said electrode members, means for passing a gaseous reactant through said spiral passage, means for passing a coolant through said tubular member, and means for cooling said walls.

3. Apparatus for producing hydrazine from gaseous reactants in electrical glow discharges comprising walls defining an elongated chamber, a hollow tubular member positioned within said chamber and spirally fluted externally to define with said walls a spiral passage through said chamber, electrode members at each end of said spiral passage, means for maintaining an electrical potential between said electrode members, means defining a truncated conical chamber communicating at the smaller end thereof with said spiral passage, a tangential inlet for a gaseous reactant adjacent the larger end of said conical chamber, means for passing a coolant through said tubular member, and means for cooling said walls.

References Cited in the file of this patent

UNITED STATES PATENTS

| | | |
|---|---|---|
| 1,359,932 | Thomas | Nov. 23, 1920 |
| 1,986,348 | Lacy | Jan. 1, 1935 |
| 2,013,809 | Salisbury | Sept. 10, 1935 |

OTHER REFERENCES

Glockler and Lind: "Electrochemistry of Gases," 1939, pages 210, 211 and 212.

Bredig et al.: Z. Physik. Chem. (A) 139 (1939), pages 211 to 223.